UNITED STATES PATENT OFFICE.

FELIX GOLDMANN, OF ELBERFELD, GERMANY, ASSIGNOR TO THE FARBENFABRIKEN, VORMALS FR. BAYER & CO., OF SAME PLACE.

PHARMACEUTICAL COMPOUND.

SPECIFICATION forming part of Letters Patent No. 509,617, dated November 28, 1893.

Application filed May 26, 1893. Serial No. 475,628. (Specimens.)

*To all whom it may concern:*

Be it known that I, FELIX GOLDMANN, apothecary, doctor of philosophy, a subject of the Emperor of Germany, residing at Elberfeld, Prussia, Germany, have invented a useful Improvement in the Manufacture of New Pharmaceutical Products, of which I give in the following a clear and exact description.

My invention relates to the production of new pharmaceutical products by treating with iodin and alkalies aromatic hydroxycarbonic acids.

In carrying out my invention practically I proceed as follows: 1.52 parts, by weight, of ortho hydroxy paratoluylic acid (meta cresotinic acid) are dissolved in fifteen hundred parts, by weight, of water with the addition of 1.06 parts, by weight, of sodium carbonate ($Na_2CO_3$). A solution prepared by dissolving 7.62 parts, by weight, of iodin and 7.62 parts, by weight, of potassium iodid in about thirty parts, by weight, of water is slowly added. After about from twenty-four to forty-eight hours the new iodin product, which is formed in this way and perfectly separates, is filtered off. When crystallized out of benzine, ligroine, or alcohol it melts at 121.5° centigrade.

The new substance produced in the above manner possesses the following formula:

The reaction taking place, viz., in subjecting cresotinic acid to the above process, can be probably illustrated by the following equation:

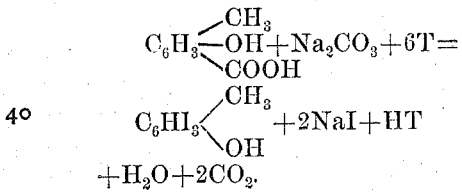

The new product which is a cresoltri-iodid forms a white crystalline powder, easily dissolves in the exactly corresponding quantity of diluted alkaline lye and contains a free hydroxylic group. This iodin compound dissolves in alcohol and ligroine with difficulty, but easily in ether, benzine, chloroform and in fatty oils.

In an analogous manner as hereinbefore described the process proceeds in the employment of the isomeric ortho or para cresotinic acid, cresoltrisiodides being likewise formed, which in general are similar to the isomeric product obtained from meta cresotinic acid.

My new product is of a great value for pharmaceutical purposes as it has been found to be effective for the cure of diseases especially for the most common dermatomycoses and primary syphilitic lesions. It is applied profitably as ointment or in alcoholic solution.

Without limiting myself to the following strengths, the ointment may be used of a strength of five per cent. and the alcoholic solution from two per cent. to ten per cent., depending upon the nature of the disease.

Having now described my invention and in what manner the same is to be performed, what I claim, and desire to secure by Letters Patent, is—

1. The process for the production of pharmaceutical compounds by treating one molecular proportion of cresotinic acid with three molecular proportion of iodin substantially in the manner hereinbefore described.

2. As a new article of manufacture the pharmaceutical compound resulting from the action of iodin on metacresotinic acid substantially as described, forming a white powder when crystallized out of benzine, ligroine or alcohol, melting at 121.5° centigrade, soluble in alcohol and ligroine with difficulty, easily soluble in ether, benzine chloroform and fatty oils, being effective in the treatment of mycoses and the like diseases.

In testimony whereof I have signed my name in the presence of two subscribing witnesses.

FELIX GOLDMANN.

Witnesses:
WILLIAM ESSENWEIN,
RUDOLPH FRICKE.